(12) United States Patent
Saiki

(10) Patent No.: US 7,431,231 B1
(45) Date of Patent: Oct. 7, 2008

(54) PORTABLE SHREDDING DEVICE

(76) Inventor: Tong Myong Saiki, 878 Hoomalu St., Pearl City, HI (US) 96782

( * ) Notice: Subject to any disclaimer, the term of this patent is extended or adjusted under 35 U.S.C. 154(b) by 0 days.

(21) Appl. No.: 11/634,406

(22) Filed: Dec. 6, 2006

(51) Int. Cl.
*B02C 9/04* (2006.01)

(52) U.S. Cl. ............................. 241/101.78; 241/282.2

(58) Field of Classification Search ............ 241/101.78, 241/282.1, 282.2
See application file for complete search history.

(56) References Cited

U.S. PATENT DOCUMENTS

| | | | | |
|---|---|---|---|---|
| 2,678,809 | A * | 5/1954 | Seilberger | 241/282.2 |
| 3,593,930 | A * | 7/1971 | Lautzenheiser | 241/188.1 |
| 4,272,031 | A | 6/1981 | Jines | |
| 4,506,601 | A * | 3/1985 | Ramirez et al. | 99/511 |
| 4,580,735 | A * | 4/1986 | Lange | 241/101.78 |
| 4,595,148 | A | 6/1986 | Luerken et al. | |
| 4,681,031 | A * | 7/1987 | Austad | 99/511 |
| 4,681,145 | A * | 7/1987 | York | 144/24.12 |
| 4,778,117 | A | 10/1988 | Karg | |
| 4,834,302 | A * | 5/1989 | Baker | 241/92 |
| 4,860,961 | A | 8/1989 | Hilgarth | |
| 5,090,093 | A * | 2/1992 | Kelly | 241/38 |
| 5,413,287 | A * | 5/1995 | Telsnig | 241/46.17 |
| 5,860,606 | A * | 1/1999 | Tiedeman et al. | 241/55 |
| 5,988,540 | A * | 11/1999 | Pugh | 241/46.17 |
| 6,029,568 | A * | 2/2000 | Pascotti et al. | 99/489 |
| 6,910,648 | B1 | 6/2005 | Reinhold | |

FOREIGN PATENT DOCUMENTS

| | | |
|---|---|---|
| DE | 4331858 A1 * | 7/1994 |
| EP | 0134378 | 3/1985 |
| EP | 0258965 | 3/1988 |
| EP | 1550365 | 7/2005 |
| FR | 2750896 | 1/1998 |

* cited by examiner

*Primary Examiner*—Faye Francis
(74) *Attorney, Agent, or Firm*—Michael I Kroll

(57) ABSTRACT

The present invention relates to a shredder for comminuting or shredding organic material to use as organic fertilizer. The shredder has a material-receiving receptacle that is removably attached to a housing. The receptacle has shredding blades disposed on the interior thereof. The housing contains the motor that drives blades to shred the material in the receptacle. A pair of wheels and a pair of stanchions (i.e. legs) support the housing of the shredder. The receptacle may employ a discharge cute to allow the user to remove the shredded material from the receptacle without removing the receptacle from the housing or turning the receptacle upside down.

23 Claims, 11 Drawing Sheets

PORTABLE SHREDDING DEVICE

BACKGROUND OF THE INVENTION

1. Field of the Invention

The present invention relates generally to comminuting and, more specifically, to a portable shredder comprising a material-receiving receptacle and a housing with a motor disposed therein where the motor is in communication with a blade assembly located inside the material-receiving receptacle.

Supporting the portable shredder are a pair of stanchions (i.e. legs) and a pair of wheels. An extendible and retractable handle assists the user in moving the device to a desired location.

A discharge aperture positioned within the receiving receptacle leads to a discharge chute. The chute is provided with a cap for selectively opening and closing the discharge chute.

The material-receiving receptacle has an open upper end which is covered by a main lid incorporating a secondary lid which is threaded onto the main lid. The material-receiving receptacle may employ at least one handle to assist the user in removing the receptacle from the housing. The receptacle may include a pair of opposed handles.

An electrical cord is provided along with a power switch for selectively engaging and disengaging the motor of the shredder.

A rechargeable battery or batteries may be provided in lieu of the power cord.

2. Description of the Prior Art

There are other comminuting device designed for vegetation. Typical of these is U.S. Pat. No. 4,272,031 issued to Jines on Jun. 9, 1981.

Another patent was issued to Lange on Apr. 8, 1986 as U.S. Pat. No. 4,580,735. Yet another U.S. Pat. No. 4,595,148 was issued to Luerken on Jun. 17, 1986 and still yet another was issued on Oct. 18, 1988 to Karg as U.S. Pat. No. 4,778,117.

Another patent was issued to Hilgarth on Aug. 29, 1989 as U.S. Pat. No. 4,860,961. Yet another U.S. Pat. No. 5,413,287 was issued to Telsnig on May 9, 1995. Another was issued to Pugh on Nov. 23, 1999 as U.S. Pat. No. 5,988,540 and still yet another was issued on Jun. 28, 2005 to Reinhold as U.S. Pat. No. 6,910,648.

Another was published on Mar. 20, 1985 to Klein as European Patent Application No. EP 0 134 378. Another patent was published to Conigliaro, et al. on Mar. 9, 1988 as European Patent Application No. EP 0 258 965. Yet another France Patent No. FR 2750896 was issued to Wolf on Jan. 16, 1996 and still yet another was published to Duregger on Jul. 6, 2005 as European Patent Application No. EP 1 550 365 and still yet.

U.S. Pat. No. 4,272,031

Inventor: Chester G. Jines

Issued: Jun. 9, 1981

An upright tank has an upper loading opening with a first horizontal wall therein spaced downwardly from the top. The horizontal wall has a central opening and an inverted frusto-conical guide extends upwardly for guiding material to be treated toward the opening. The upper portion of the tank has a fluid inlet. A horizontally operating cutter blade is disposed adjacent the opening in the horizontal wall, and such cutter blade initially cuts and shreds material received down the guide for producing a slurry. A second horizontal wall is disposed below the first wall to form a compartment therebetween and a cutter-impeller assembly is provided in this compartment to receive the slurry from the cutter blade and further reduce the material and mix it with fluid from the fluid inlet to provide a resulting readily flowable slurry. A driven shaft operates the cutter blade and cutter-impeller assembly and an outlet is radially disposed through which the slurry is discharged. The tank may be sealed at the top and provided with pressurized fluid. Such pressurized fluid may be accomplished by connection to a conventional garden hose.

U.S. Pat. No. 4,580,735

Inventor: Ulrich Lange

Issued: Apr. 8, 1986

A size-reduction apparatus, especially for twigs and branches of trees and shrubbery is disclosed. The apparatus is provided with a loading chute, a chopping chamber having a chopping blade which rotates about a vertical axis, a shredding chamber having a cutting blade which rotates about a vertical axis, a feed tube which opens into the shredding chamber, a drive motor, and a respective discharge chute or conduit for each of the shredding and chopping chambers. The chopping blade and the cutting blade are driven separately by a respective shaft, and the chopping chamber and the shredding chamber are disposed next to one another.

U.S. Pat. No. 4,595,148

Inventor: Adolf Luerken, et al.

Issued: Jun. 17, 1986

A comminuting apparatus for garden waste consists of a cutter support plate rotating about a vertical axis in a cutter housing provided with a laterally directed outlet channel. The support plate includes cutting slots and slicing cutters thereabove. The support plate further includes at least one dependent discharge blade located on the underside thereof. At least one spiral deflecting vane is mounted on the cutter housing beneath the support plate. Upon rotation of the cutter support, the cutting slots and slicing cutters cooperate to direct comminuted material downwardly through the support plate, while the dependent discharge blade and the spiral deflecting vane cooperate to force comminuted material out through the laterally directed outlet channel.

U.S. Pat. No. 4,778,117

Inventor: Erwin Karg

Issued: Oct. 18, 1988

In the context of a device for chopping up garden waste or the like of the type comprising a housing mounted on support legs and having at least one ejector opening, a preferably vertical charging passage mounted on the housing, a carrier disk adapted to rotate in the housing about an upright axis and mounted on the shaft of a motor attached to the housing so that the disk shuts off the housing at a lower end thereof and at least one generally radially aligned knife on the disk which is placed on a trailing edge, i.e. the edge which is to the rear in the direction of rotation, of a slot in the disk, the knife being arranged to cooperate with a stationary support bolster in the form of a circumferential part, extending transversely in relation to the direction of rotation, of the charging passage under which the knife moves, the invention seeks to achieve an improved functional performance and a compact construction insofar as in at least a lower part thereof the charging passage has a cross section which extends from the edge part of the carrying disk towards its center provided with a deflector mounted thereon and which is provided with at least one circumferential inward protrusion, whose trailing side respectively forms a stationary support bolster for supporting the waste being chopped, and furthermore the motor is carried on the floor part, overlapped by the carrier disk, of a housing chamber, which at its circumference has a number of ejection openings equal to the number of inward protrusions, whose axis is in a projection generally perpendicular to the projection of the side, which forms the respective associated stationary support bolster, of the corresponding circumferential inward protrusion of the charging chamber.

U.S. Pat. No. 4,860,961

Inventor: Gunther Hilgarth

Issued: Aug. 29, 1989

An internally mounted rotary drum drive mechanism optimizes the space within a drum by utilizing a rim-mounted, motor-driven rotating gearbox for applying torque to the drum through a ring-type mounting flange releasably secured between the gearbox and an internal wall of the drum. Radial screws extend through oversize apertures in the wall of the drum for releasably attaching the gearbox to the drum. A motor mounting flange locates the motor in driving position adjacent the gearbox. The motor mounting flange is supported on a reactor tube extending out of the drum and the reactor tube is supported by an external anchor plate. The drive mechanism may be situated at one end of the drum, and a bearing assembly of similar character to the drive mechanism, but using a rim-mounted dummy gearbox, may be provided internally at the other end of the drum.

U.S. Pat. No. 5,413,287

Inventor: Adolf Telsnig

Issued: May 9, 1995

A chopping device for chopping waste material, in particular household and garden wastes, has a housing having a filling opening and a discharging opening for a waste material, a rotor rotatably supported in the housing between the filling opening and the discharging opening and having a substantially vertical rotary axis and also having at least one throughgoing gap, a rotary drive for rotating the rotor about the rotary axis, at least one cutter provided at an upper side of the rotor and at least one driver provided at a lower side of the rotor, and at least one holding element for the waste material cooperating with the rotor. The rotor is funnel-shaped and has a side wall which is provided with the throughgoing gap and the cutter and a central bottom part which is connected with the rotary drive and from which the side wall projects upwardly and outwardly toward the filling opening so as to expand substantially conically.

U.S. Pat. No. 5,988,540

Inventor: Terrance Pugh

Issued: Nov. 23, 1999

A comminuting and distribution device for recycling yard waste is provided. The device includes a mixing tank mounted on an upper surface of a movable support structure. The mixing tank includes a slurry preparation structure therein for creating a slurry from yard waste and fluid deposited within the mixing tank. A distribution structure draws the slurry from a mixing tank and distributes the same to a desired location outside the mixing tank for fertilizing a lawn, garden or the like.

U.S. Pat. No. 6,910,648

Inventor: Theodore William Reinhold

Issued: Jun. 28, 2005

This invention provides garden refuse shredding apparatus (10) which has a chipping rotor (20) supported for rotation about a vertical shaft (31) in a chamber (11) which has a hopper (14) which feeds refuse to radially disposed elongate chipper blades (30) which span a major part of the rotor (28). Fan blades (44) are supported on the rotor for creating an airflow through the hopper (14) to assist feed to the chipping rotor and to assist discharge of shredded refuse from the outlet (45). The chipping rotor (20) is driven directly from the vertical output shaft (36) of an electric motor or a petrol engine (21).

European Patent Application Number EP 0 134 378

Inventor: Josef Klein

Issued: Mar. 20, 1985

The machine contains an obliquely arranged housing (1) in which a device (22) for comminuting material filled into it is located. This device (22) contains a hub (25) on which a blade bar (23) for comminuting material falling onto it is mounted. The hub (25) is also provided with ejector wings (28, 29) which are located under the blade bar (23). In the region of the ejector wings (28, 29), the housing (1) is provided with an outlet opening (11) for the treated material. The outlet opening (11) is covered by a wall (16) in which there are openings, this outlet wall (16) extending along the casing (8) of the housing (1). The part (30) of the casing (8) opposite the perforated wall (16) is provided with a corresponding blade (31). Mounted on the housing (1) is a filling device (3) which is bent at an angle and which contains a device (40) for metering the amount of material to be introduced into the machine. Such a machine is particularly suitable for comminuting medium-sized amounts of fruit, vegetables, potatoes etc.

European Patent Application Number EP 0 258 965

Inventor: Anthony Conigliaro

Issued: Mar. 9, 1988

A shredder has a container (10) enclosing a chamber (12). A shredding mechanism (22) is rotatably mounted in the chamber (12) and is driven by an exteriorly located motor (24). A loading port is provided in the container through which the material to be shredded may be received in the chamber. The arrangement of the loading port (16) in relation to the shredding mechanism (22) is such that the thus received material will drop under the influence of gravity onto and be shredded by the shredding mechanism (22). The shredded material (p) exits through a discharge port (20) underlying the shredding mechanism (22).

France Patent Number FR 2750896

Inventor: Outils Wolf

Published: Jan. 16, 1998

A garden waste shredder consists of a housing (2) containing the shredding blades, driven by a motor (3), a supporting frame (1) and a feed pipe (4) topped by a funnel (4a). The feed pipe can be inclined relative to the vertical and locked in different positions to adjust the height of its input funnel. The feed pipe is fixed to the blade housing and adjusted together with it by means of frame pivots (6) and sliders (7a), or, in a variant, telescopic frame legs. The housing outlet (5) can be equipped with a hinged deflector plate which stays vertical regardless of the angle of the outlet, so that the shredded material is always directed downwards.

European Patent Application Number EP 1 550 365

Inventor: Georg Duregger

Issued: Jul. 6, 2005

The knife chamber has a tongue-shaped extension (20-22) which engages with a corresponding cavity (30-32) in the feed hopper wall (39) in order to create a form-fit connection between the chamber and hopper (8). The knife chamber in the shredder casing (2) houses a rotary disc (10) on which at least one blade extending in a radial direction is mounted. The blade cooperates with a fixed stop on the casing. Material is added to the chamber via a feed hopper.

While these comminuting devices may be suitable for the purposes for which they were designed, they would not be as suitable for the purposes of the present invention, as hereinafter described.

SUMMARY OF THE PRESENT INVENTION

A primary object of the present invention is to provide a portable shredder for food scraps and yard vegetation so that the shredded matter may be employed as organic fertilizer.

Another object of the present invention is to provide a portable shredder having a housing with a motor disposed therein and a material-receiving receptacle.

Yet another object of the present invention is to provide a portable shredder wherein said housing has a pair of stanchions and a pair of wheels depending from the housing providing means for selectively moving the device from one location to another.

Still yet another object of the present invention is to provide a portable shredder wherein the material-receiving receptacle has a blade assembly positioned inside the receptacle.

Another object of the present invention is to provide a portable shredder wherein the material-receiving receptacle has a dispensing aperture leading to a discharge chute with a cap for selectively dispensing the shredded material from the chute.

Yet another object of the present invention is to provide a portable shredder wherein the material-receiving receptacle further comprises a main lid with a secondary lid threaded therein.

Yet another object of the present invention is to provide a portable shredder that my be operated by a rechargeable battery or batteries.

Additional objects of the present invention will appear as the description proceeds.

The present invention overcomes the shortcomings of the prior art by providing a portable shredder having a material-receiving receptacle and a housing with a located therein. The material-receiving receptacle has a blade assembly disposed inside positioned adjacent the lower end thereof. The motor is in communication with the blade assembly when the material-receiving receptacle is positioned on the housing. Supporting the portable shredder is a pair of stanchions (i.e. legs) and a pair of wheels. The housing is provided with an extendible and retractable handle to assist the user in moving the device to a desired location. A discharge aperture positioned within the material-receiving receptacle leads to a discharge chute where a cap for opening and closing the discharge chute. A main lid, incorporating an inner lid that is threaded onto the main lid, covers the open top of the material-receiving receptacle. The main lid is provided with handles to assist the user in removing the main lid from the receptacle. The material-receiving receptacle is provided with at least one handle or a pair of opposing side handles to assist the user in removing the receptacle from the housing. An electrical power cord is provided along with a power switch for selectively engaging and disengaging the shredder motor. A battery or batteries may be employed in lieu of a power cord.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

LIST OF REFERENCE NUMERALS

With regard to reference numerals used, the following numbering is used the drawings.
- 10 Present Invention
- 12 Housing
- 14 Material-Receiving Receptacle
- 16 Handle
- 18 Pour Spout
- 20 Discharge Chute
- 22 Cap
- 24 Shredder Blades
- 26 Blade Drive Element
- 28 Motor Drive Element
- 30 Main Lid
- 32 Spout Plug Portion
- 34 Secondary Lid
- 36 Threads
- 38 Air Gap
- 40 Motor
- 42 Power Switch
- 44 Power Cord
- 46 Wiring
- 48 Wheels
- 50 Stanchions
- 52 Extensible Handle
- 54 Organic Waste Matter
- 56 Organic Fertilizer
- 58 User
- 60 Bucket
- 62 Sidewall
- 64 Tapered Upper End Wall
- 66 Battery

DETAILED DESCRIPTION OF THE PREFERRED EMBODIMENT

The following discussion describes in detail one embodiment of the invention. This discussion should not be construed, however, as limiting the invention to those particular embodiments, practitioners skilled in the art will recognize numerous other embodiments as well. For definition of the complete scope of the invention, the reader is directed to appended claims.

FIGS. 1 and 7-9 are illustrative views of the present invention 10 in use. The present invention 10 is a portable shredder. The shredder may be employed to shred organic waste matter 54 from a garden or any other organic waste matter 54 that a user may desire to turn into organic compost or organic fertilizer 56. The shredder may be employed on non-organic material. Two major components of the shredder are the housing 12 and the material-receiving receptacle 14. A pair of stanchions 50 and a pair wheels 48 supports the housing 12. An extensible handle is joined to the housing 12 so the shredder can be easily moved from one location to another. The material-receiving receptacle 14 is equipped with shredder blades 24 for shredding the organic waste matter 54 or other desired material. The housing 12 has a motor 40 disposed therein for driving the shredder blades 24 in the material-receiving receptacle 14.

Figure 1:
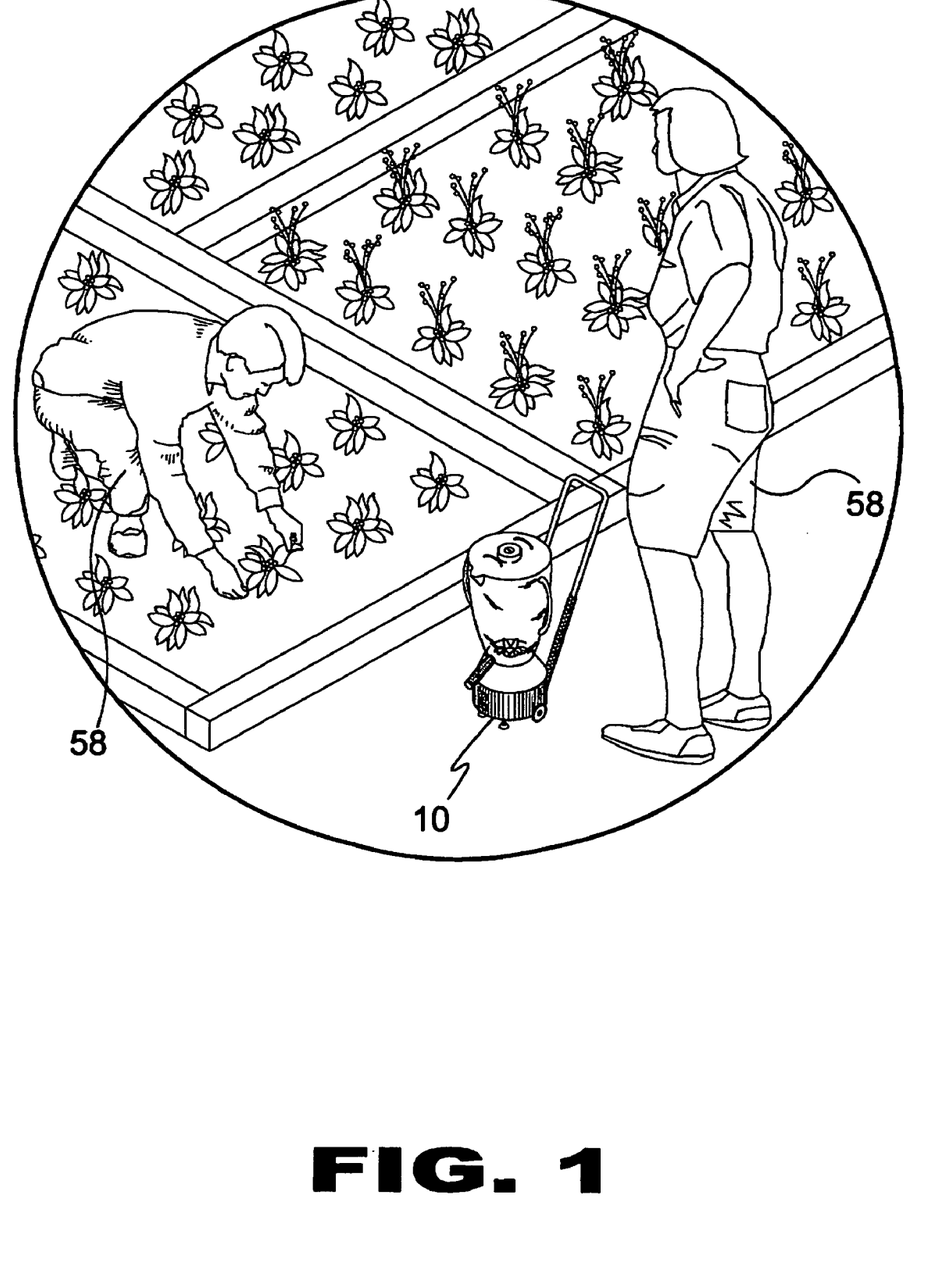
FIG. 1 is an illustrative view of the present invention in use.
Figure 2:
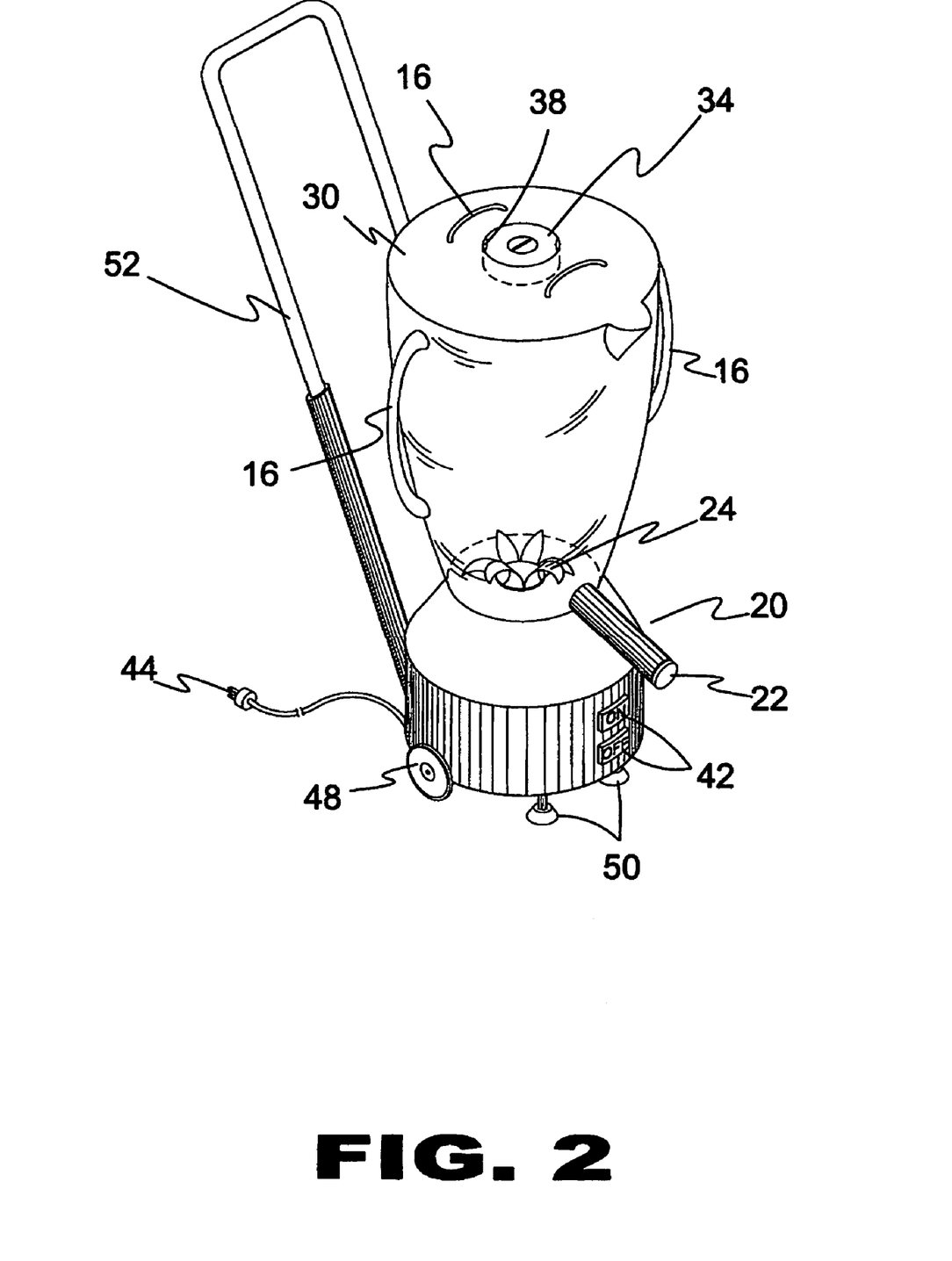
FIG. 2 is a perspective view of the present invention.
Figure 3:
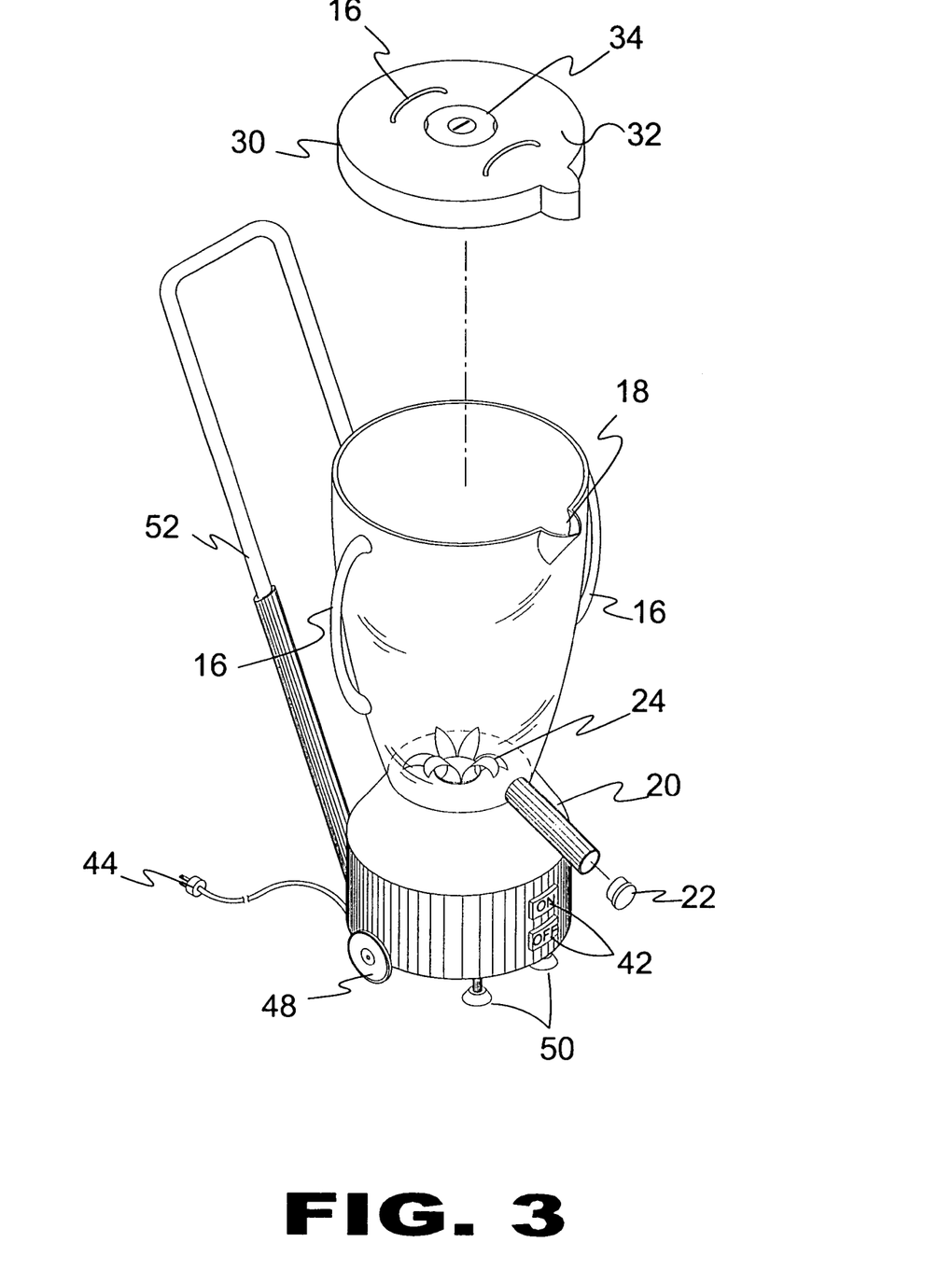
FIG. 3 is an exploded view of the present invention.
Figure 5:
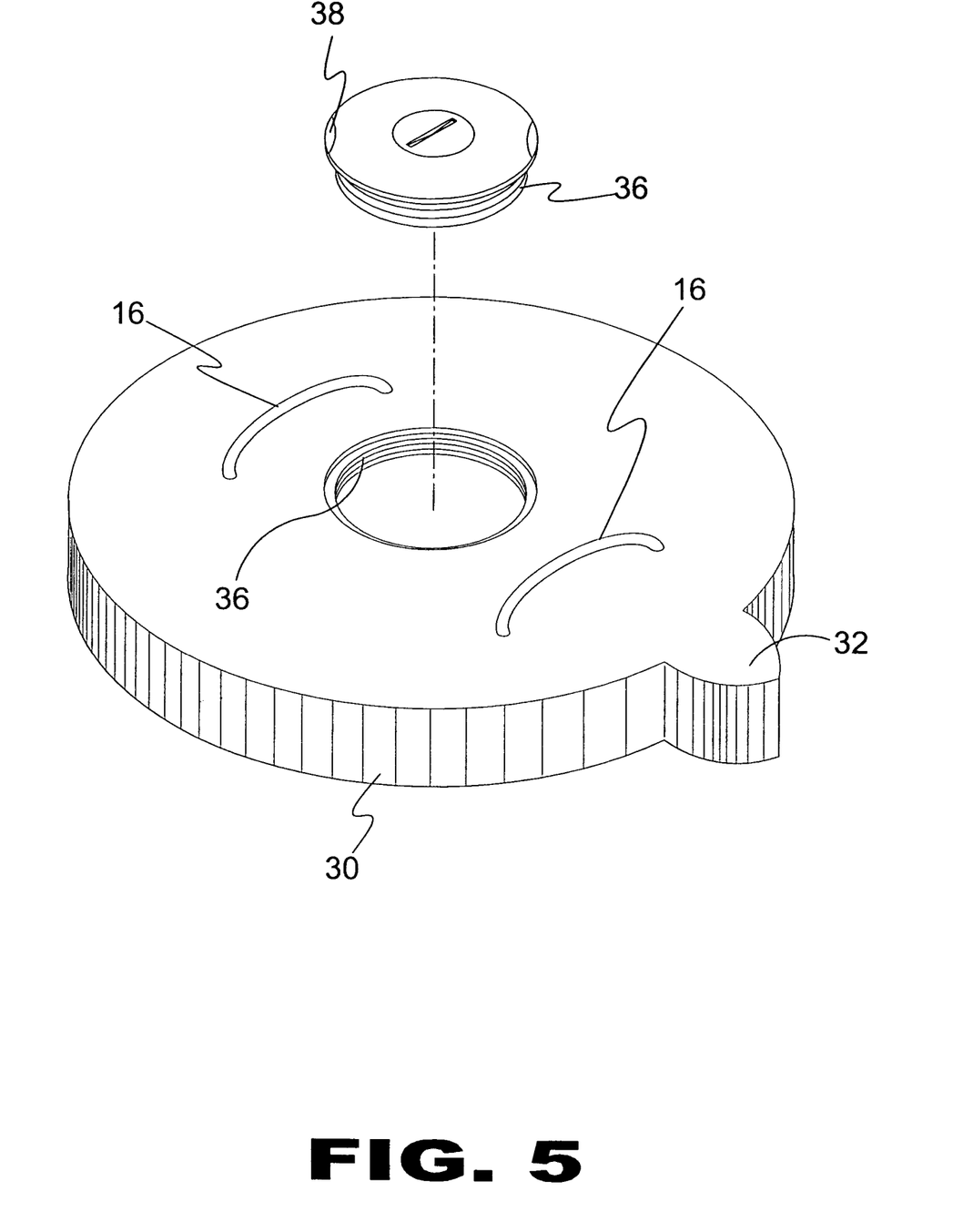
FIG. 5 is a perspective view of the main and secondary lids.

A perspective view of the present invention 10 is seen in FIG. 2. The material-receiving receptacle 14 is removable from the housing 12 to facilitate storage of the unit in smaller spaces or to clean the receptacle 14. The receptacle 14 preferably has a pair of handles 16 disposed thereon but may employ a single handle 16. The pair of handles is preferably disposed on opposite sides of the receptacle 14 approximately 180 degrees apart. They assist the user in lifting the receptacle 14 and removing it from the housing 12. The receptacle 14 may be provided with a pour spout 18 to assist the user in discharging material from the open upper end of the receptacle 14. The pour spout 18 may be disposed intermediate the pair of handles 16. A single handle 16 would preferably be located on the receptacle opposite the pour spout 18. The receptacle 14 may employ a discharge chute 20 to allow the user to remove shredded material from the receptacle 14 without removing the receptacle 14 from the housing 12 or turning the receptacle 14 upside down. A cap 22 may be provided to close off the discharge chute 20 to prevent the material from exiting the receptacle 14 before it is shredded. The cap may employ locking means for securing itself to the chute 20. The locking means may be threads or any other suitable mechanism such as but not limited to snap or bayonet. The receptacle 14 has a closed lower end to retain the contents in the receptacle 14 so that it can be completely shredded. The lower end of the receptacle 14 has shredder blades 24 disposed therein. The blades 24 are located inside the receptacle 14. The blades 24 are connected to a drive blade drive element 26. The blade drive element 26 is positioned on the underside of the closed end of the receptacle 14. The motor 40 has a motor drive element 28 that is joined to the motor 40 and is positioned on the upper end of the housing 12. The motor drive element 28 is on the exterior of the housing 12 so that it engages the blade drive element 26 when the receptacle 14 is positioned on the housing 12 so that the motor 40 drives the shredder blades 24 via the engagement of the motor drive element 28 and the blade drive element 26. The drive elements may be gears or the like or any other type of engaging members which will positively interlock with each other and allow the receptacle 14 to removed from the housing 12. The receptacle 14 is provided with a main lid 30 to prevent any material from existing the open upper end of the receptacle 14 during the shredding process. The main lid 30 may have two handles 16 disposed thereon to assist the user 58 in removing the main lid 30 from the receptacle 14. The handles 16 of the main lid 30 are disposed on the main lid 30 approximately 180 degrees apart from each other. FIG. 5 shows and enlarged view of the main lid 30. The main lid 30 is of the plug type that fits down into the opening in the upper end of the receptacle 14 to plug or close the opening. The main lid 30 has a spout plug portion 32 that is contoured to plug or close the pour spout 18 (FIG. 5). The main lid 30 has a secondary lid 34 disposed therein. The secondary (or smaller) lid 34 is threaded into the main lid 30 so that it locks onto the main lid 30 to prevent accidental removal. The secondary lid 34 is provided with air gaps 38 to allow air to flow in and out of the receptacle 14 between the secondary lid 34 and the main lid 30. It is envisioned that the air gaps 38 will allow air to flow between the two lids when the secondary lid 34 is in a slightly raised position relative to the main lid 30 and prevent air from entering and existing the receptacle 14 when the secondary lid 34 is fully seated on the main lid 30. One of the pair of handles 16 of the main lid 30 may be positioned between the secondary lid 34 and the spout plug portion 32. It is preferred that the material-receiving receptacle 14 be made of a transparent material that is both durable and lightweight. It is envisioned that the receptacle 14 is made from a durable transparent plastic or any other durable transparent material. It is also envisioned that the receptacle 14 may be made of a translucent or an opaque material.

Figure 4:
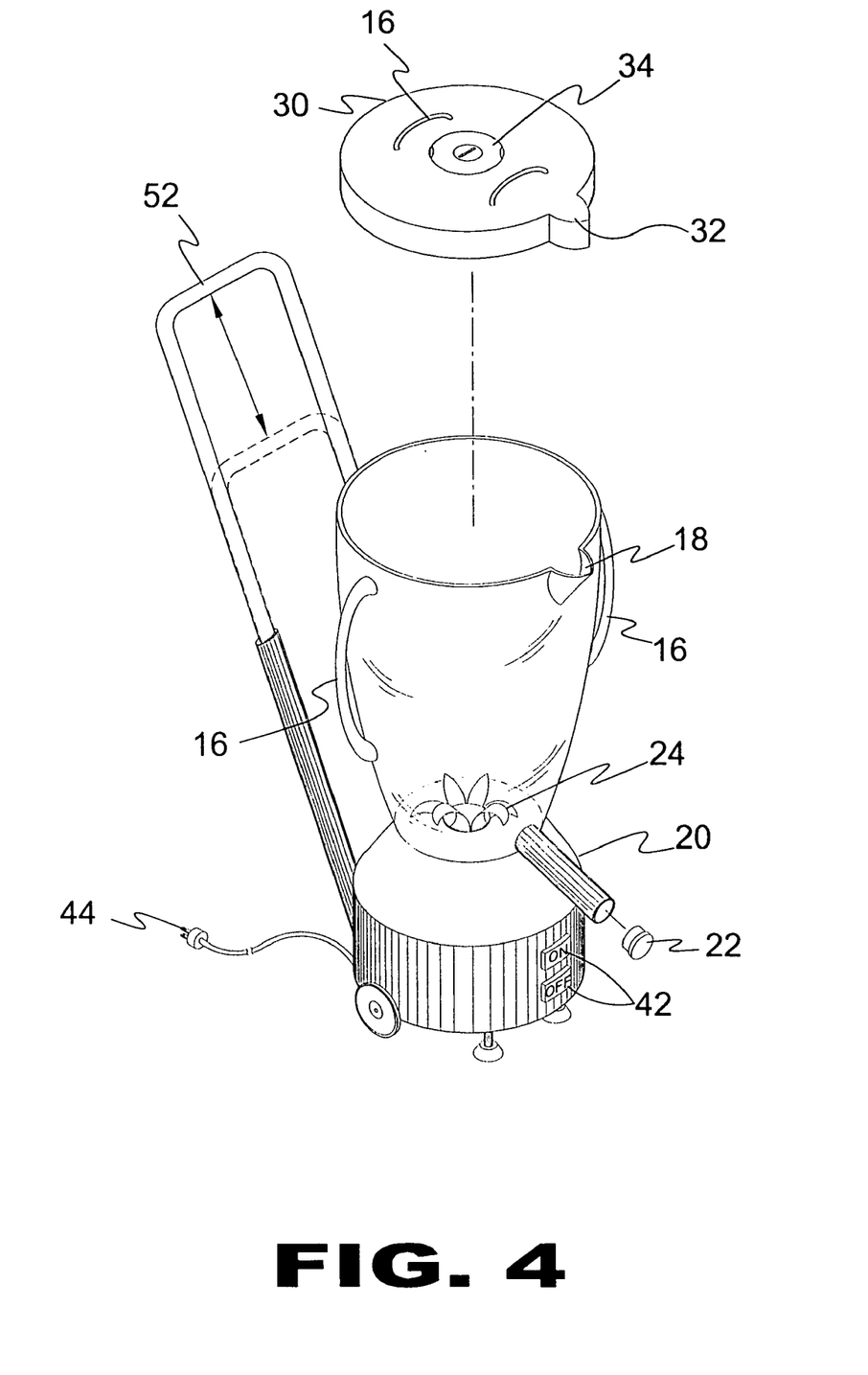
FIG. 4 is a perspective view of the present invention.
Figure 6:
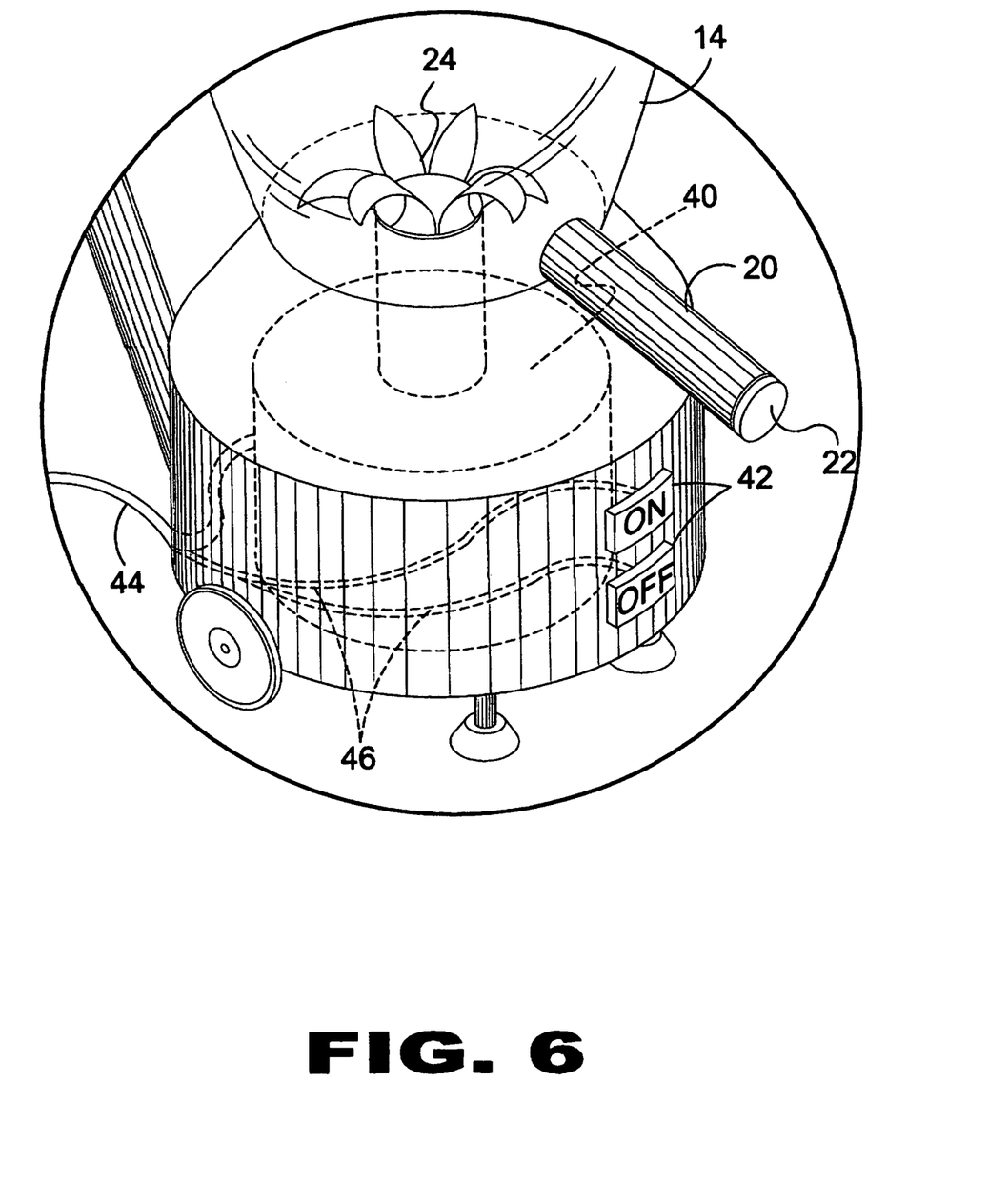
FIG. 6 is an enlarged view of the shredder housing.
Figure 6A:
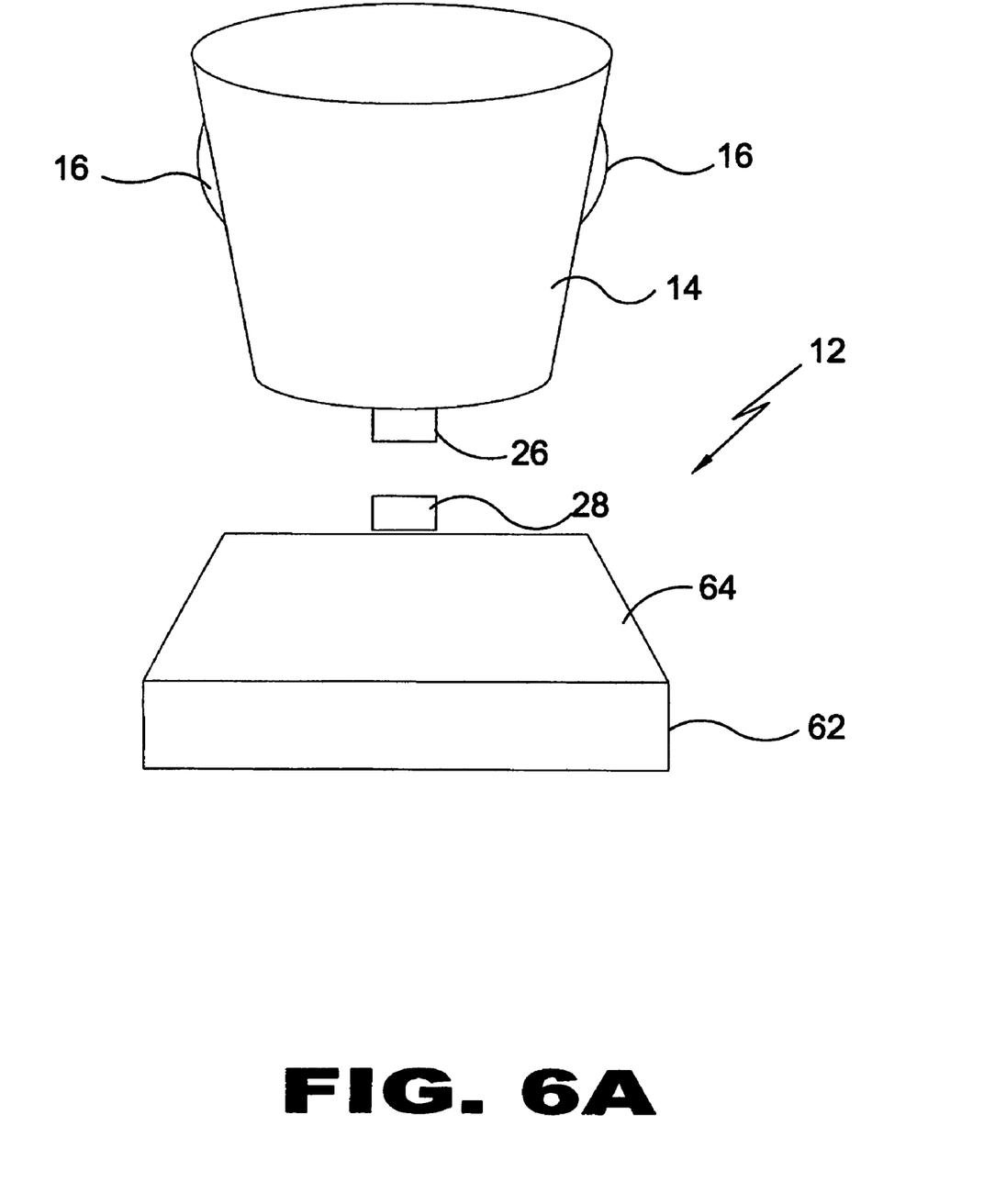
FIG. 6A is a perspective view of the receptacle separated from the housing.
Figure 6B:
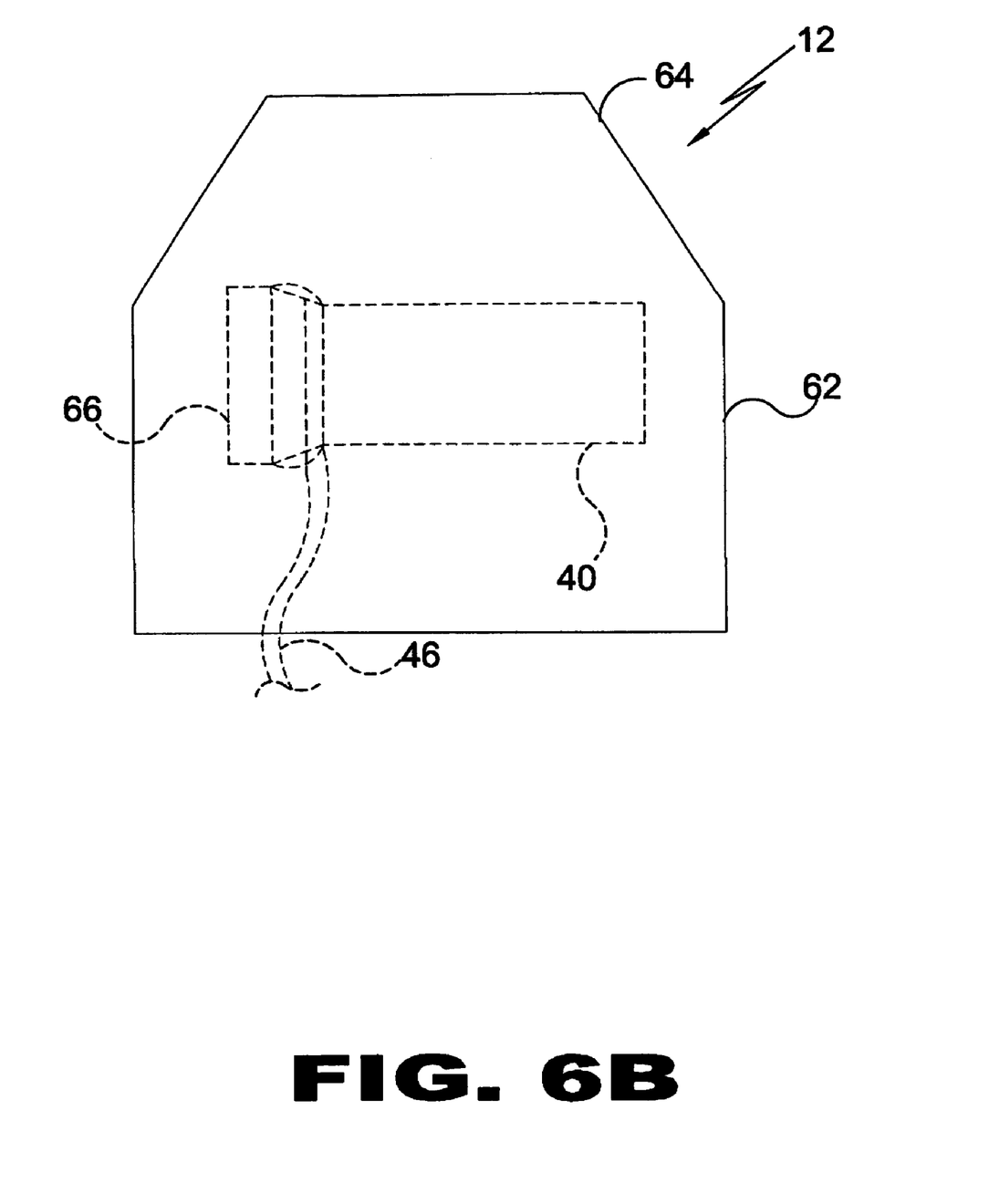
FIG. 6B is a perspective view of the housing employing a battery to power the motor.
Figure 7:
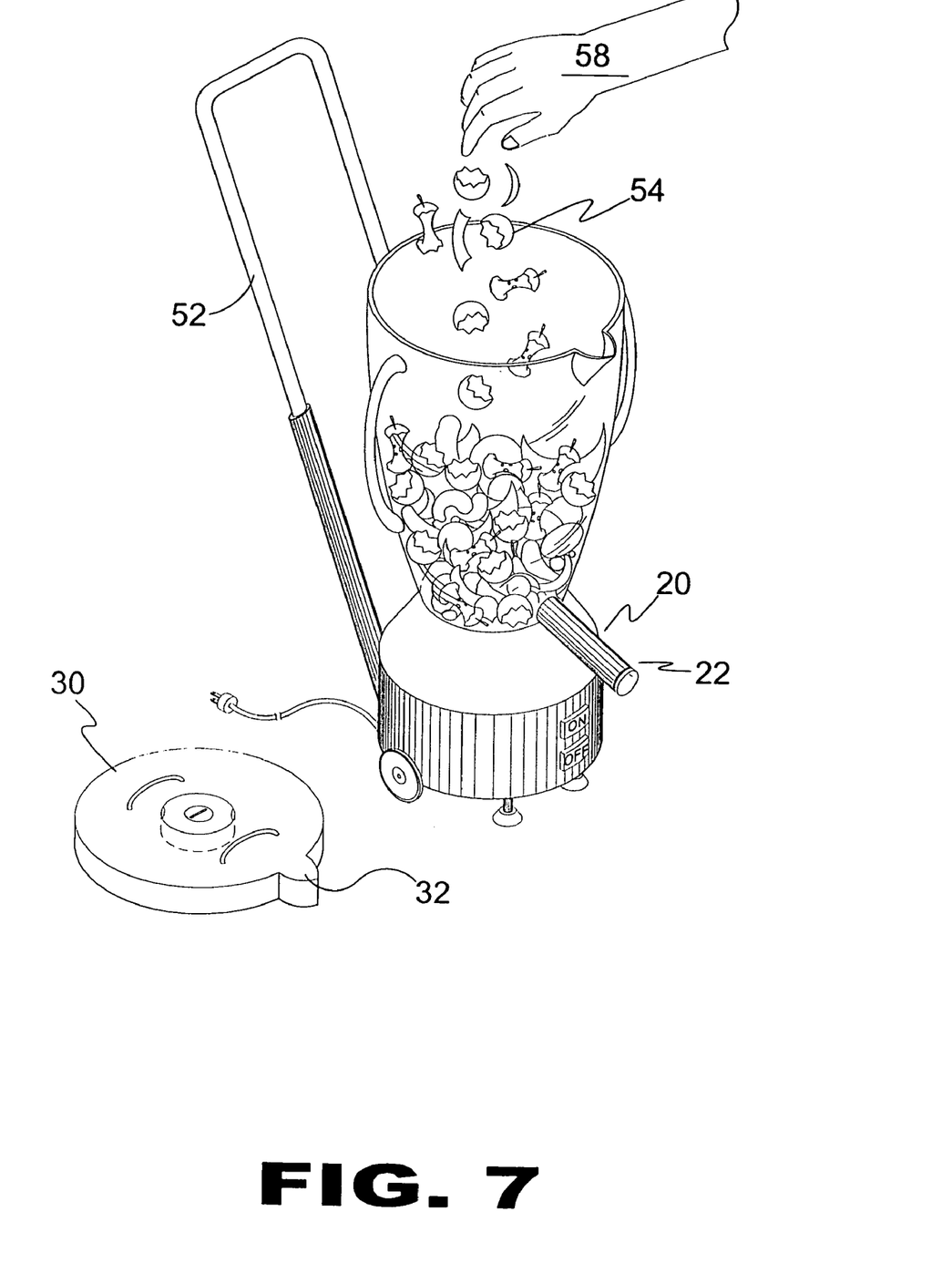
FIG. 7 is a perspective view of the present invention.
Figure 8:
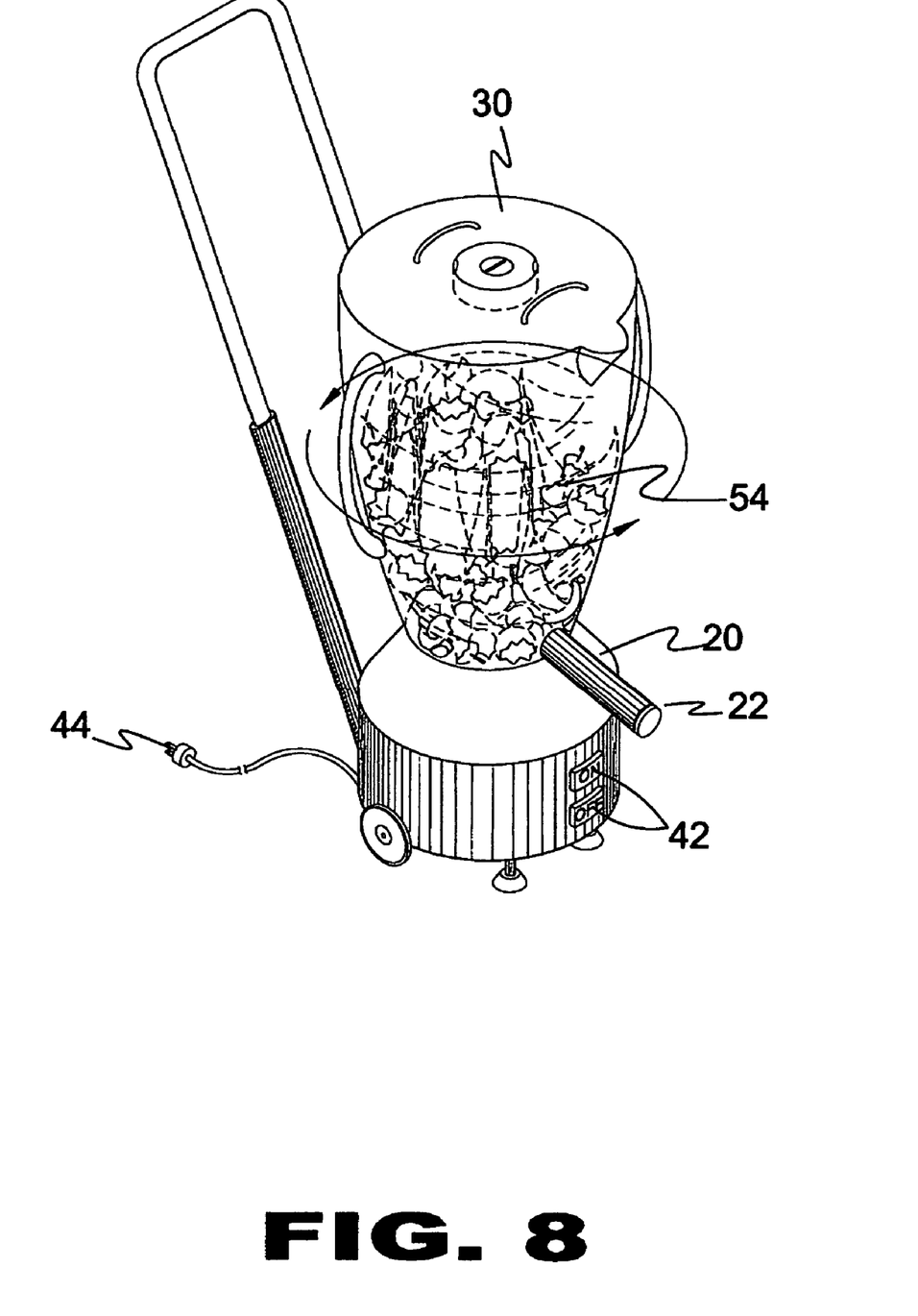
FIG. 8 is a perspective view of the present invention.
Figure 9:
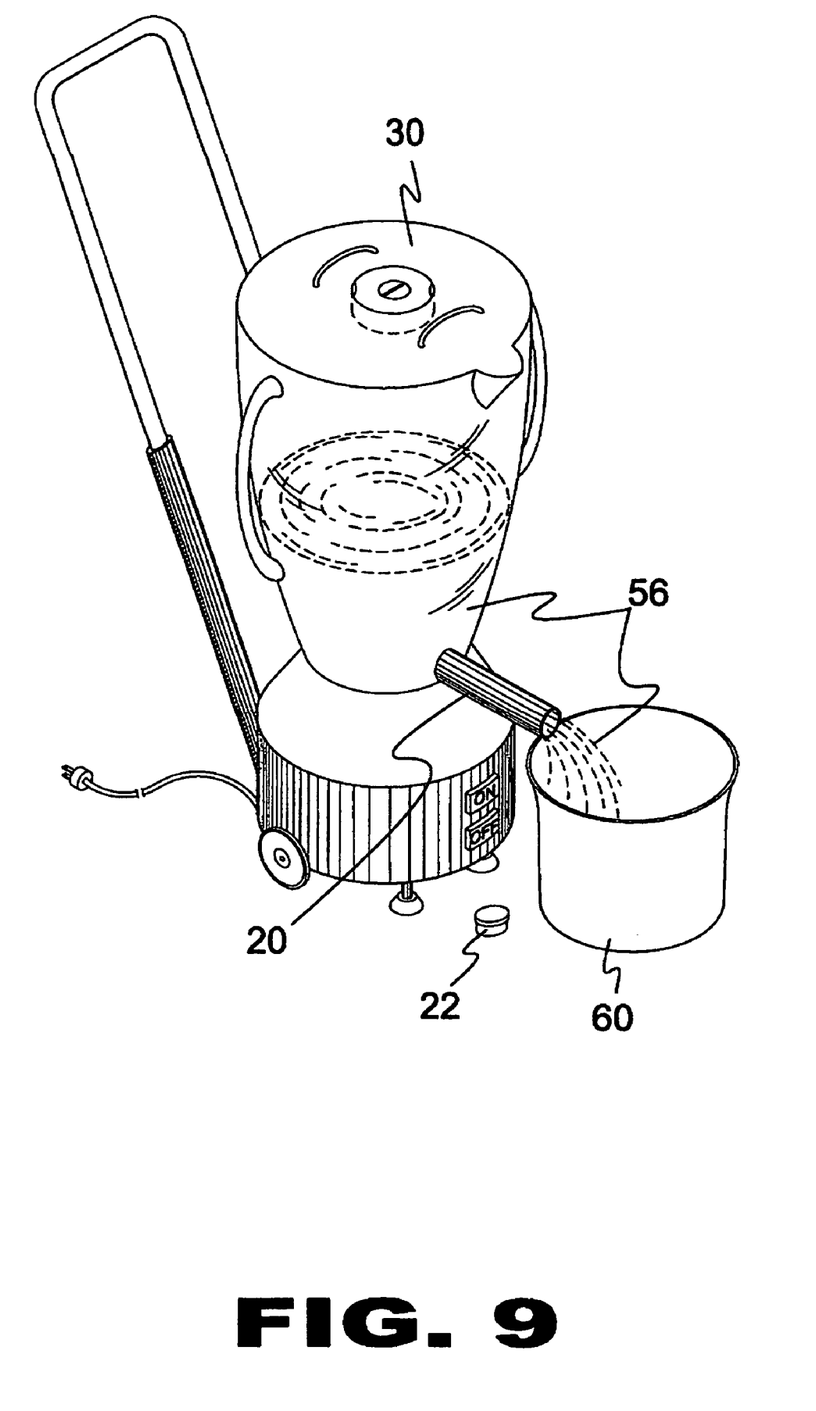
FIG. 9 is a perspective view of the present invention.

An enlarged view of the housing 12 of the present invention is seen in FIG. 6. The housing 12 has the motor 40 disposed therein. The housing 12 is shown with a circular sidewall 62 but other shapes may be employed such as but not limited to square, rectangular, hexagonal, etc. The housing 12 preferably has a bottom wall (not shown) which closes off the lower end of the sidewall 62 of housing 12. The housing 12 preferably has a tapered upper end wall 64 that closes off the upper end of the sidewall 62 to protect the motor and the other contents of housing 12. The tapered upper end wall 64 elevates the receptacle 14 with respect to the sidewall 62 and provides room or clearance for the discharge chute 20. The discharge cute 20 extends radially outwardly beyond the sidewall 62 of the housing 12. This extension allows material exiting the discharge chute 20 to be collected into a container such as a bucket 60 as seen in FIG. 9. The motor 40 provides the power to drive the shredder blades 24. The motor 40 may be powered by household current (alternating current) via a power cord 44 or a battery 66 may power the motor 40. It is envisioned that the battery 66 would be rechargeable and the shredder would include a charger that could be connected to the shredder to charge the battery 66 without removing the battery 66 from the shredder. The housing 12 has a power switch positioned on or through the outer surface of the sidewall of the housing (FIG. 6). The power switch 42 allows the user to turn on and off the motor. The power switch 42 may employ two push buttons. The on button is depressed when to turn the motor 40 on and the off button is depressed to turn the motor 40 off. It is envisioned that the housing 12 may be provided with a safety interlock so that the motor 40 will not start until the receptacle 14 has been properly positioned on the housing 12. It is also envisioned that the receptacle 14 may employ a locking means to secure the receptacle 14 into place on the housing 12 to prevent the receptacle 14 from being accidentally separated from the housing 12. The power switch 42 is connected to the motor 40 and the power cord 44 by wiring 46 disposed inside the housing 12 in the household or alternating current powered shredder and the motor 40, the power switch 42 and at least one battery 66 are connected by wiring 46 disposed inside the housing 12 in the battery powered shredder. The housing 12 has a pair (two) stanchions 50 or legs, which support the front of the housing 12 (FIG. 6). It is envisioned that the legs may be adjustable to level the housing 12 on uneven ground or surfaces. The legs may be secured to the underside or bottom wall of the housing 12 but the legs are not limited to this position. They may be secured on the sidewall 62 of the housing 12 or they may be secured to or be an extension of the sidewall 62 of the housing 12. The housing 12 has a pair (two) rotating wheels 46 that support the rear of the housing 12 and allow the device to be readily transported from one location to another. An extensible 52 handle is provided on the rear of the housing 12 to assist the user 58 in transporting the shredder from one location to another. The extensible handle 52 has an extended position where the extensible handle 52 is longer and has a retracted position where the extensible handle 52 is shorter. The extensible handle 52 preferably has means to lock the extensible handle 52 in both the extended and the retracted positions. The upper end of the extensible handle 52 slides telescopically into the lower end of the extensible handle (FIG. 4). The extended position is used for transporting the device and the retracted position is used when storing the device.

I claim:

1. A shredder for organic material, the shredder comprising:
a material-receiving receptacle with a closed lower end, the receptacle having shredding blades disposed adjacent the lower end, the receptacle having an open upper end terminating in a rim, the receptacle having at least one handle, a housing having a motor for driving the blades, wherein the motor is in communication with the blades when the receptacle is placed onto the housing so that that the motor is capable of driving the blades when turned on by a power switch, a main lid for closing the upper end of the receptacle to prevent the contents of the receptacle from exiting the receptacle when the blades are in motion, wherein the receptacle has a discharge chute adjacent the closed end thereof such that shredded material may be removed from the receptacle without removing the receptacle from the housing or turning the receptacle upside down, wherein the main lid has a secondary lid disposed therein, where the secondary lid is threaded into the main lid and is removably threaded onto the main lid.

2. The shredder of claim 1, wherein the housing has a sidewall that encloses the housing and a tapered upper end wall which elevates the receptacle above the upper end of the sidewall.

3. The shredder of claim 2, wherein the discharge chute extends radially outward beyond the sidewall of the housing.

4. The shredder of claim 3, wherein a pair of wheels and a pair of stanchions supports the housing.

5. The shredder of claim 4, wherein the stanchions have a height that is adjustable.

6. The shredder of claim 5, including a handle attached to the housing to assist the user in transporting the device on the wheels.

7. The shredder of claim 6, wherein the handle has an extended position and a retracted position where the handle is longer in the extended position then in the retracted position.

8. The shredder of claim 7, including means for locking the handle in the extended and the retracted positions.

9. The shredder of claim 8, wherein the power switch is positioned on or through the sidewall of the housing.

10. The shredder of claim 1, wherein receptacle includes a pour spout.

11. The shredder of claim 10, wherein the main lid has a spout plug portion that plugs and closes the pour spout.

12. The shredder of claim 11, wherein the main lid has a pair of handles to assist the user in removing the main lid from the receptacle and one of the handles is adjacent the spout plug portion.

13. The shredder of claim 1, wherein the secondary lid has air gaps which allow air to enter and exit the receptacle when the secondary lid is in a position that is raised relative to the main lid.

14. The shredder of claim 13, wherein the secondary lid prevents air from entering and exiting the receptacle when the secondary lid is fully seated onto the main lid.

15. The shredder of claim 1, wherein the shredder has a power cord and the motor is powered by alternating current.

16. The shredder of claim 15, wherein the motor and the power switch and the power cord are connected by wiring.

17. The shredder of claim 1, wherein the motor is battery powered.

18. The shredder of claim 17, wherein the motor, the battery and the power switch are connected by wiring.

19. The shredder of claim 17, wherein the battery is rechargeable.

20. The shredder of claim 1, wherein the main lid has at least one handle to assist the user in removing the main lid from the receptacle.

21. The shredder of claim 1, including a motor drive element that is joined to the motor and a blade drive element joined to the shredding blades, wherein when the receptacle is positioned on the housing the motor drive element engages the blade drive element so that the motor drives the blades via the interlocking engagement of the drive elements, and wherein the blade drive element is positioned on an underside of the closed end of the receptacle.

22. The shredder of claim 1, including a cap for selectively opening and closing the discharge chute.

23. The shredder of claim 22, wherein the cap includes locking means for securing the cap on the discharge chute.

* * * * *